United States Patent [19]

Kendrick et al.

[11] Patent Number: 5,025,664
[45] Date of Patent: Jun. 25, 1991

[54] MULTIPLE CRYSTAL HEAD FOR DEPOSITION THICKNESS MONITOR

[75] Inventors: Mark F. Kendrick, Syracuse; Carl A. Gogol, Manlius, both of N.Y.

[73] Assignee: Leybold Inficon, Inc., East Syracuse, N.Y.

[21] Appl. No.: 430,428

[22] Filed: Nov. 2, 1989

[51] Int. Cl.⁵ ............................................. G01N 29/04
[52] U.S. Cl. ........................................ 73/579; 118/712
[58] Field of Search .................... 73/579, 23.2, 24.06, 73/24.01; 118/664, 665, 712, 715; 427/8, 9, 10; 422/88

[56] References Cited

U.S. PATENT DOCUMENTS

| | | | |
|---|---|---|---|
| 3,383,238 | 5/1968 | Unzicker et al. | 118/664 |
| 3,670,693 | 6/1972 | Rorick et al. | 118/665 |
| 4,121,537 | 10/1978 | Maruyama et al. | 118/664 |
| 4,362,125 | 12/1982 | Schadler | 118/664 |

Primary Examiner—Hezron E. Williams
Assistant Examiner—Louis M. Arana
Attorney, Agent, or Firm—Wall and Roehrig

[57] ABSTRACT

A multiple crystal head has aluminum rotary carousel within an aluminum body, and number of crystals disposed about the axis of the carousel. A water line coil is clamped to the aluminum body by a stainless steel clamp plate, and a beryllium copper finger spring provides thermal contact between the carousel and the body so that any heat from the deposition process is quickly removed by the water coil. A space is maintained between the front of the carousel and the proximal side of the body front face so that there is no scraping when the carousel rotates. A removable stainless steel heat shield over the body provides good thermal isolation and prevents deposits from reaching the aluminum body or other parts behind the shield. A pneumatic bellows and a pawl and ratchet assembly rotate the carousel to bring the various crystals into the active, monitoring position.

17 Claims, 5 Drawing Sheets

MULTIPLE CRYSTAL HEAD FOR DEPOSITION THICKNESS MONITOR

BACKGROUND OF THE INVENTION

This invention is directed to apparatus for monitoring and controlling the deposit of materials on substrates by vapor deposition. The invention is more particularly concerned with quartz crystal deposition monitors, in which the resonance frequency of a piezoelectric crystal is monitored, with changes in the resonance frequency corresponding to changes in thickness of the deposited material. More specifically, the invention relates to a multiple-crystal detector, in which a number of crystals can be moved in turn into a monitoring station, so that the monitoring and control function can continue after one of the crystals loses its ability to detect further thickness changes.

Quartz crystal monitors have been widely used to monitor vacuum deposition processes and to control accurately the amount of material deposited and the rate of deposit onto a surface. In these monitors, one or more piezoelectric crystals which can be quartz, barium titanate, or another suitable material, are connected into a resonance circuit so that the natural resonant frequency of one crystal can be monitored. The natural resonance is primarily dependent upon total mass and geometry of the crystal, and the resonance frequency drops in relation to the amount of material coated onto it during a vacuum deposition process. However, as the deposited material builds up, the sharpness of resonance diminishes, and eventually a point is reached in which the crystal can no longer monitor the process accurately or effectively. Then, the quartz crystal must be replaced.

A number of multi-crystal quartz oscillator deposition monitors have been proposed in which there are a number of crystals that can be rotated in turn into a monitoring position to facilitate changing of crystals with a minimum of down time and without introducing mechanical stresses from insertion of the crystals. Such multi-crystal monitors are described, for example in U.S. Pat. No. 4,362,125 and U.S. Pat. No. 3,383,238.

Mechanical and thermal stresses can also affect the resonance frequencies of the crystals in the monitor. However, prior multi-crystal monitors have not incorporated heat shields or heat sinks, and are subject to temperature stresses from the heat produced in a vacuum deposition process.

OBJECTS AND SUMMARY OF THE INVENTION

It is an object of this invention to provide a multiple crystal deposition monitor which improves upon, and avoids the drawbacks of, the monitors of the prior art.

It is a more specific object of this invention to provide a multiple crystal monitor in which there is a reduced direct heat load both on the body of the device and on the crystals within it.

It is another object of the invention to provide a quartz crystal monitoring head in which quartz crystals can be removed and replaced simply and easily, and without need to remove the monitor from the deposition system.

If is a further object of this invention to provide a quartz crystal deposition monitor in which one or more radiation shields provide a thermal buffer for the crystals, and in which heat is effectively conducted.

It is a still further object of this invention to provide a multiple crystal monitor in which the crystals can be rotated into a monitoring station from outside the vacuum chamber.

It is a yet further objective to provide the quartz crystal monitor with freedom of mounting within the vacuum chamber.

In accordance with an aspect of this invention, a quartz crystal vapor deposition monitor has a plurality of piezoelectric crystals, each mounted in a crystal holder, with the crystal holders being reposed in receptacles that are positioned about the axis of a rotary carousel. For example, there can be six crystal holders in a corresponding six receptacles distributed at sixty-degree intervals. The carousel is pivotally mounted in a body that can be of generally cylindrical shape. Both the body and carousel can be formed of a high thermal conductivity material, for which aluminium is preferred. A beryllium-copper finger spring is situated in an annular recess within the body, and contacts the periphery of the carousel. The finger spring provides good thermal communication between the carousel and the body, and permits relative rotation of the two without scraping. A clamp plate, which is made of a low thermal conductivity material such as stainless steel, covers a front side of the body over the carousel, and has window through it that exposes a single one of the piezoelectric crystals disposed in registry with the window, but shields all the remaining crystals from heat of vapor deposition. A waterline cooling coil is clamped to the periphery of the body by the clamp plate and is pressed into thermal contact with the body to conduct away heat from the body and from the carousel.

A removable shield covers the front wall and the sides of the body and clamp plate with an opening disposed in registry with the window of the clamp plate. This shield is preferably formed of stainless steel and is held in place onto the clamp plate by a snap in pin. Preferably, the window in the clamp plate is sufficiently large to permit crystal carriers to be withdrawn and replaced, needing only to remove the shield.

The carousel is selectively rotated, from one station to the next, to rotate by steps the various crystals in turn into registry with the window. A ratchet wheel mounted on the pivot shaft for the carousel has teeth that engage a movable pawl. The pawl is stroked by a pneumatic bellows or similar actuator over a predetermined path. The pawl engages the wheel in the one direction to rotate the carousel and skips over the teeth of the wheel in the other direction. A detent wheel mounted or formed on the carousel has indentations on its periphery. A detent boss is movably mounted on the detector body to move radially into these indentations to engage the detent wheel. This serves to locate the crystal holders in proper registry with the window, and hold them in position.

The shield covers the front and sides of the monitor. This element reduces direct heat load on the body and crystal holders. Also, it is quickly removed and cleaned, and can be replaced with a similar shield while being cleaned. Most other parts do not receive significant quantities of deposit, except for portions of the crystal holders, which are also removable. None of the other components need to be removed from the deposition system.

Solderless waterline cooling is accomplished by the waterline surrounded by the aluminium body and clamped in place by the clamp plate which serves as a secondary radiation shield. A short, high thermal conductivity path to the waterline is provided by the finger springs.

The secondary radiation shield formed by the clamp plate provides a thermal buffer between the removable shield and the aluminum body. The stainless steel clamp plate has minimal thermal input into the waterline, because of its low thermal conductivity. There is also a high thermal gradient from front to rear of the clamp plate due to its low thermal conductivity. This gradient further reduces thermal stress on the body and crystal carousel.

The double radiation shield dramatically reduces heat load at the front side of the unit, since heat transfer is proportional to the fourth power of absolute temperature difference at each interface. Conduction and convection do not contribute to heat transfer, as the device is used only in high vacuum.

The thermal conductivity finger springs provide excellent thermal transfer between the water cooled main body and the carousel, without high applied forces.

Maintaining a significant area of contact between the crystal carousel and the cooled body is complicated in the prior art design, because mating surfaces are not necessarily flat. Pressing the carousel into contact with the body requires high force for the device to be efficient. This pressure requires high torque to turn the carousel and can scrape excessive particulate from the two surfaces rubbing across each other. Particulate matter is a source of defects in microelectronic and micromechanical devices. Any reduction of particulate is therefore desirable. A spring disposed over the pivot shaft is strictly to keep the carousel in place against a ball bearing and to maintain the vertical or axial position.

A welded pneumatic bellows is used as an actuator to drive the linear stroke of a pawl. This motion is converted to rotary motion by the toothed ratchet wheel. The mechanism is compact, permitting the assembly to be installed into very small areas. The airline to the bellows is relatively flexible, allowing the multiple crystal monitor assembly to be positioned optimally for a given deposition monitoring operation. The use of the airdriven bellows actuator eliminates the need for any mechanical penetration into the vacuum chamber, so moving seals can be avoided. Moreover, the temperature limitations that are characteristics of electric motors are also avoided.

The location of a specific crystal at the monitoring position on the carousel can be accomplished by sequentially indexing the various crystals into the monitoring position and measuring the resonance frequency prior to any deposition. The stored frequencies and location sequence may then be used to specifically choose crystal positions or to repeat depositions of the same material on the same crystal. The frequency of each specific crystal can be stored when new crystals are installed and whenever the crystal carousel is indexed.

The above and many other objects, features, and advantages of this invention will be more fully understood from the ensuing description of a preferred embodiment of the invention, which is to be read in connection with the accompanying drawing.

DETAILED DESCRIPTION OF THE PREFERRED EMBODIMENT

Figure 2:
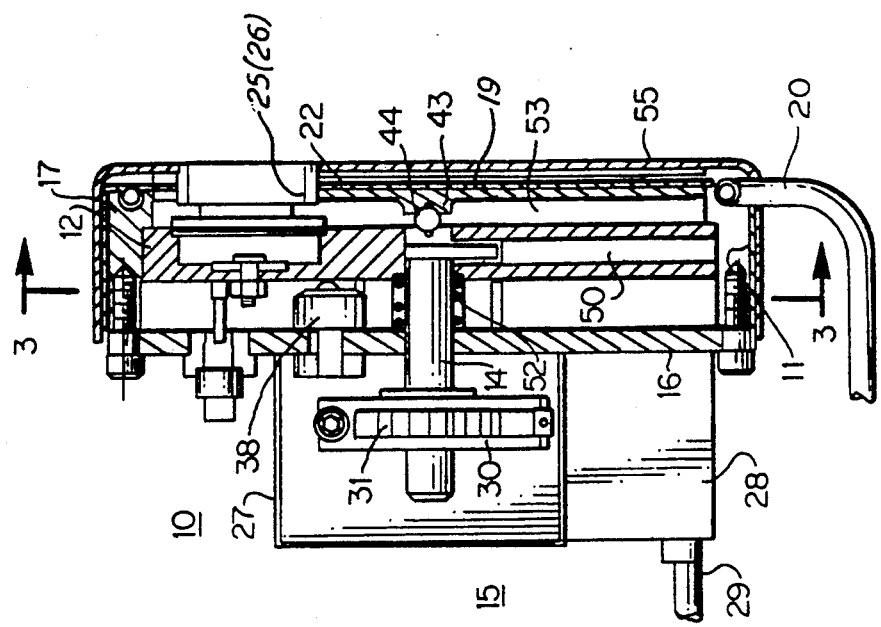
FIG. 2 is a sectional view taken at 2—2 of FIG. 1.
Figure 1:
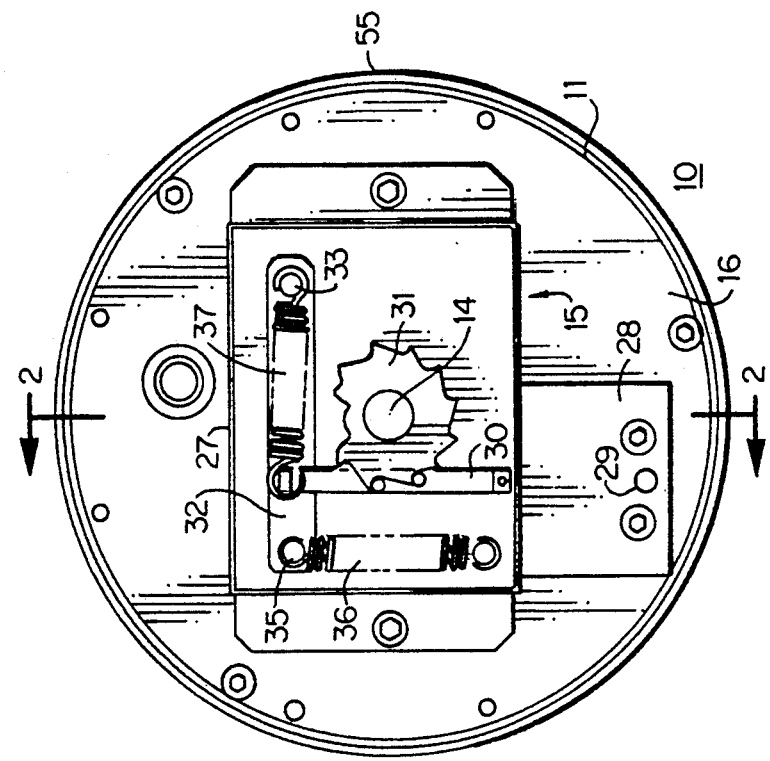
FIG. 1 is a rear plan view of a multiple crystal head for a deposition thickness monitor according to one preferred embodiment of this invention.
Figure 3:
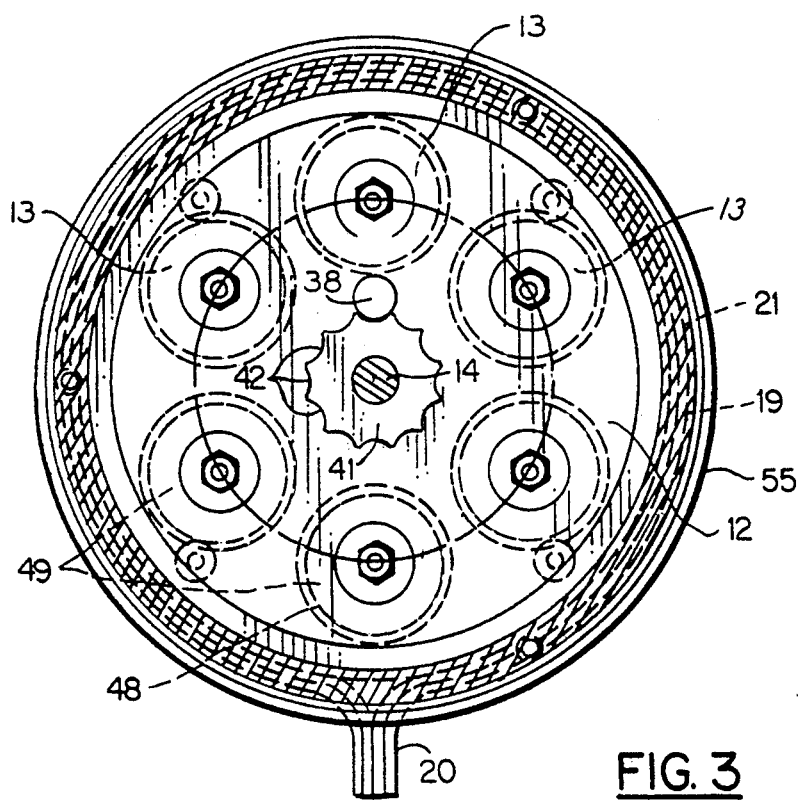
FIG. 3 is a sectional view taken at 3—3 of FIG. 2.

With reference to the Drawing and initially to FIGS. 1 to 3, a multiple-crystal head 10 is provided for sensing the thickness of a coating or deposit being applied in a chamber, e.g. by vacuum deposition. The head 10 is arranged such that each of a number of crystals can be advanced in turn to a monitoring position, and this can be accomplished and controlled from outside the vacuum chamber. The various parts are also shown in the assembly view of FIG. 8.

The head 10 has a generally cylindrical body 11 formed of a good thermal conductor, such as aluminum. A carousel 12 in the form of an aluminum rotatable disk 12 is coaxially situated within the body 11 and has a plurality of crystal stations 13 regularly spaced on it. In this embodiment there are six stations spaced at sixty degrees. A pivot shaft 14 is connected to the carousel 12 and to an actuator 15 which is disposed outside a rear cover plate 16. In this embodiment, the pivot shaft 14 and the rear cover plate 16 are formed of stainless steel, which is a relatively poor thermal conductor.

The body 11 has a generally cylindrical sidewall 11 whose inner surface has annular groove 18 at the distal or forward side of the wall 17. A disk end wall 19 generally closes off the distal side of the cylindrical side wall 17. A tubular stainless steel waterline 20 has a circular loop 21 that is situated in the annular groove 18. A front clamp plate 22, formed of stainless steel, is positioned over the disk end wall 19 of the body and clamps the waterline 20 in good thermal contact against the groove 18 of the body 11. The front clamp plate is held in place by threaded fasteners which extend through holes 23 in the body end wall 19 into threaded holes 24 in the front clamp plate 22. The disk end wall 19 and front clamp plate 22 are spaced a small distance apart because of the presence of the waterline loop 21. This space provides a conduction barrier between the plate 22 and the body 11.

A circular window 25 in the clamp plate 22 is in registry with a similar circular window 26 in the disk end wall 19 of the aluminum body 11, and these define an active station for a predetermined one of the stations 13 that happens to be aligned with the windows 25 and 26.

Figure 8:
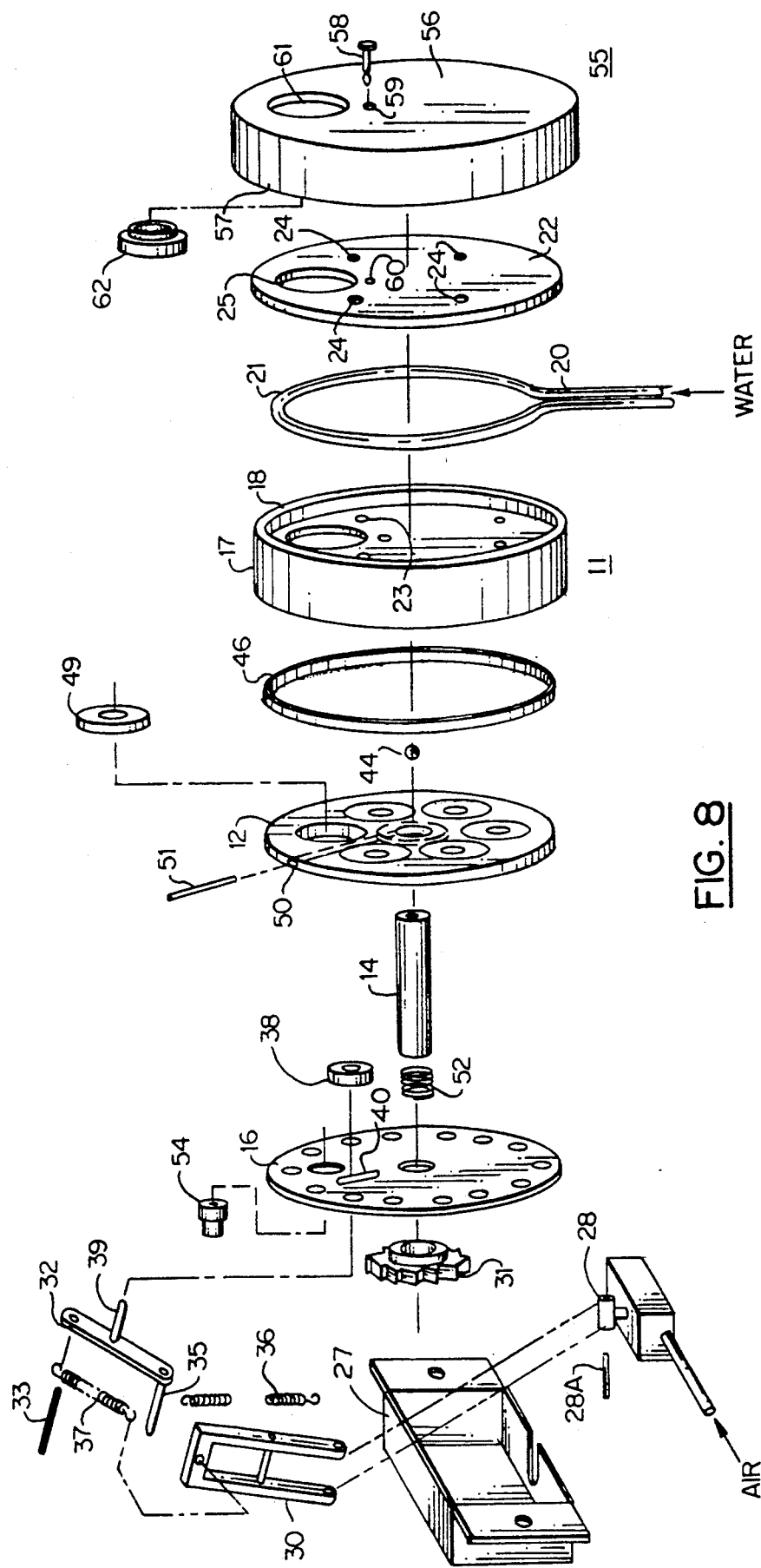
FIG. 8 is an exploded assembly view of the multiple crystal head of this embodiment.

As shown in FIGS. 1, 2, and 8, the actuator 15 has a mechanism disposed within a cover 27, to which is attached a welded stainless steel bellows 28 having an airline 29 that extends outside the vacuum chamber. A bifurcated pawl 30 is connected by a connector pin 28A to an actuator stem on the bellows 28. A 12-tooth ratchet wheel 31 is mounted on the pivot shaft 14. This wheel 31 is engaged by the pawl 30 so as to push against the teeth and turn the wheel when the pawl 30 is moved in one direction, but to skip over the teeth when the pawl retracts in the other direction. A detent mounting plate 32 pivots on a pin 33 that extends into the rear cover plate 16. Another pin 34 is affixed on the cover plate adjacent the bellows 28 and is coupled resiliently to a post 35 on the free end of the detent mounting plate 32 by means of a coil spring 36. Another coil spring 37 connects the pin 33 to the free end of the pawl 30 to bias the pawl against the wheel 31.

A detent boss 38, in the form of a ¼" outside diameter bearing, is mounted on a post 39 on the plate 32. The post protrudes into the interior of the body 11 through an elongated opening 40 in the rear cover plate 16.

A detent wheel 41 is unitarily formed with the carousel 12 and is coaxial therewith. The detent wheel 41 has twelve indentations on its periphery spaced at 30 degree intervals. The indentations are arcuate to fit against the curvature of the detent boss 38.

The spring 36 biases the detent boss against the detent wheel 41 in a aligned one of the indentations. This achieves precise angular positioning of the carousel 12. The spring 36 may be attached onto the stem of the actuator bellows 28 so as to minimize "breakout" force as the actuator and pawl 30 more forward on a stroke. The force between the detent boss 38 and the detent wheel 41 subsequently increases on the return stroke. This action ensures precise positioning without excessive force.

It should be seen that in this embodiment, there are twelve rotational positions whereas there are only six stations 13. This means that the actuator 15 is energized two times in order to advance the carousel 12 from one station 13 to the next. This arrangement permits the pawl 30 to have a smaller stroke, thus rendering the actuator assembly 15 relatively compact.

Figure 5:
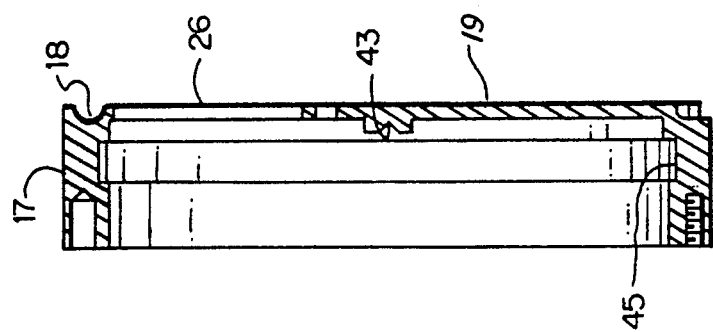
FIG. 5 is a section of the body or housing taken at 5—5 of FIG. 4.
Figure 4:
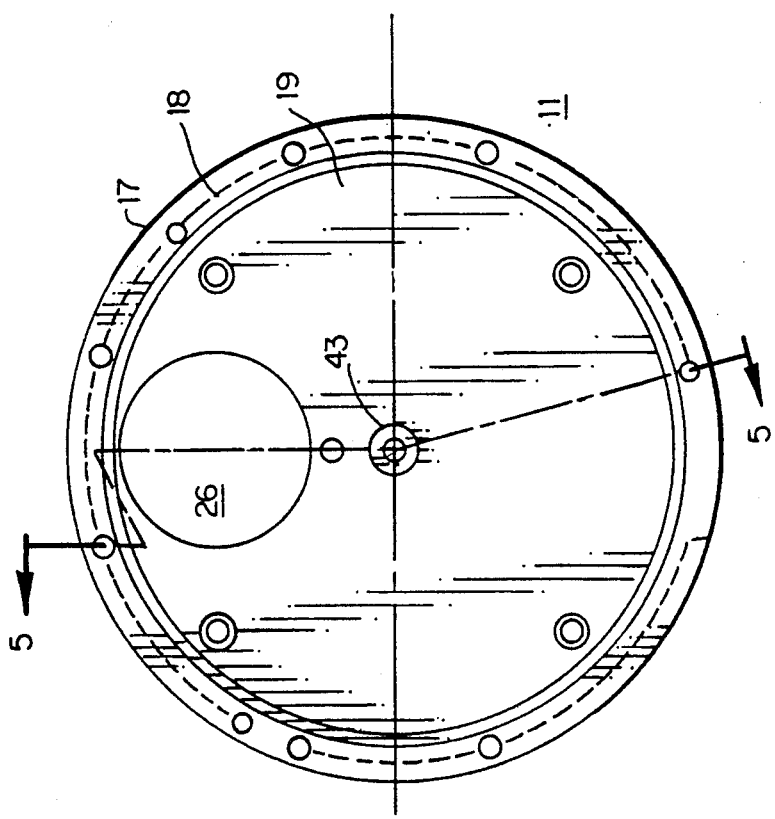
FIG. 4 is a rear plan of the body or housing of the multiple crystal head of this embodiment.

Referring to FIGS. 4 and 5, the end wall 19 of the aluminum body 11 has an axial bearing 43 with a hollow at its center to receive a ball bearing 44. The pivot shaft 14 also has a hollow at its distal end to fit this bearing ball 44. An annular groove 45 situated on the inner side wall of the body 11 receives a beryllium-copper annular finger spring 46, as shown in FIG. 8. The finger spring 46 provides good thermal contact as between the periphery of the carousel 12 and the cylindrical wall 19 of the body 11.

Figure 6:
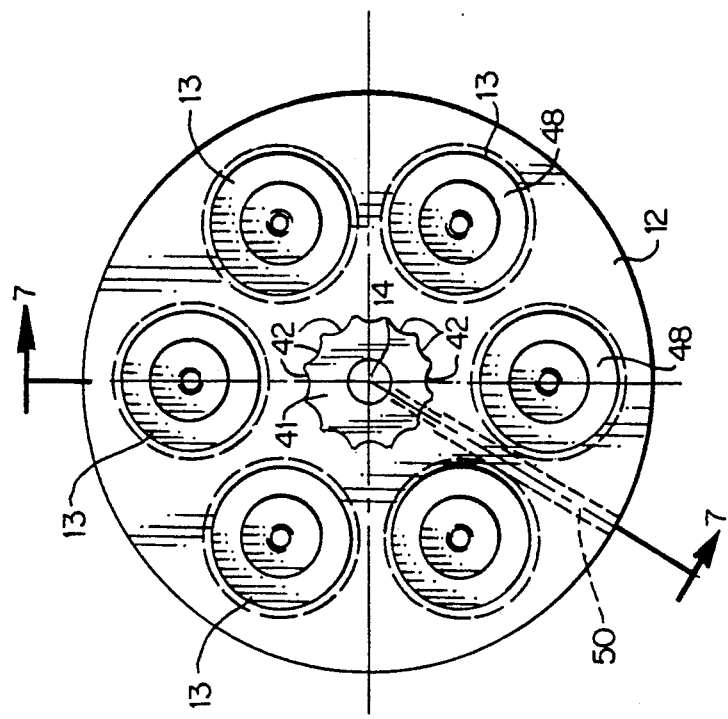
FIG. 6 is a rear plan view of the carousel or turret of the multiple crystal head of this embodiment.
Figure 7:
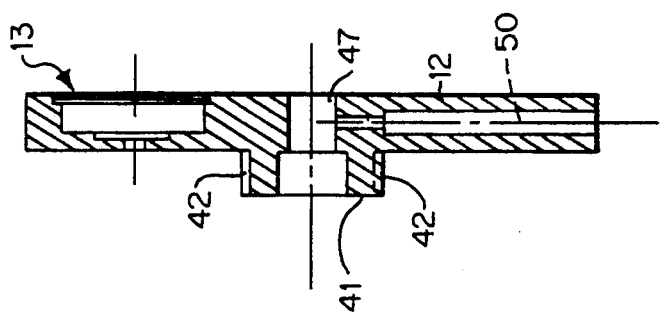
FIG. 7 is a sectional view of the carousel taken at 7—7 of FIG. 6.

Referring to FIGS. 6 and 7, the carousel 12 is seen to have an axially bore 47 to receive the shaft 14, and a plurality of receptacles 48, which define the crystal stations 13. Each receptacle receives a crystal holder 49 which is generally in the form shown in FIG. 8. The crystal holders have a diameter which is slightly smaller than the diameter of the windows 25 and 26 and also have a rim which protrudes slightly in advance of the front or distal side of the carousel 12. A radial bore 50 is provided so that a pin 51 can be inserted to affix the aluminum carousel 12 onto the stainless steel shaft 14. As shown in FIG. 8, a compression spring 52 is disposed over the shaft between the rear cover plate 16 and the carousel 12 to urge the shaft against the bearing wall 14, and to maintain proper spacing between the carousel 12 and the front wall 19 of the body 11. A small axial space 53 remains between the carousel 12 and the wall 19, due to the presence of the ball 44. This space ensures that there is no scraping or grinding between the wall 19 and the carousel 12 and crystal holders 49.

An electrical contact 54, which includes a metal conductor contained within a ceramic body, fits into a receptacle in the rear cover plate 16. The contact conducts an electrical signal only to the crystal contained in the holder that is disposed at the particular one of the stations 13 that is in registry with the windows 25 and 26.

A heat shield 55 is generally cup shaped and formed of stainless steel. This shield performs a radiation shield function and also provides a removable, cleanable outer surface to prevent undue deposit or coating of material from occurring on the body 11. The heat shield 55 has a circular front wall 56 and a generally cylindrical skirt or flange 57, which covers the clamp plate 22 and the cylindrical wall 17 of the body 11, respectively. A retaining pin 58 extends through a hole 55 in the heat shield front wall 56, and also through a corresponding hole in the clamp plate 22 permitting the heat shield 55 to be snapped into place and held securely, and then permitting it to be removed by snapping it out away from the clamp plate 22 and the body 11. An opening 61 in registry with the window 25 in the clamp plate permits the crystal and holder 49 at the active station 13 to be exposed through the windows 25, 26, and the opening 61, so that a deposition process can be monitored. A tubular, stainless steel heat shield extender 62 is situated within the opening 61 and facing towards the clamp plate 22. This extender 62 is slightly smaller in internal diameter than the holders 49. This minimizes the radiation exposure within the monitoring head 10.

Figure 9:
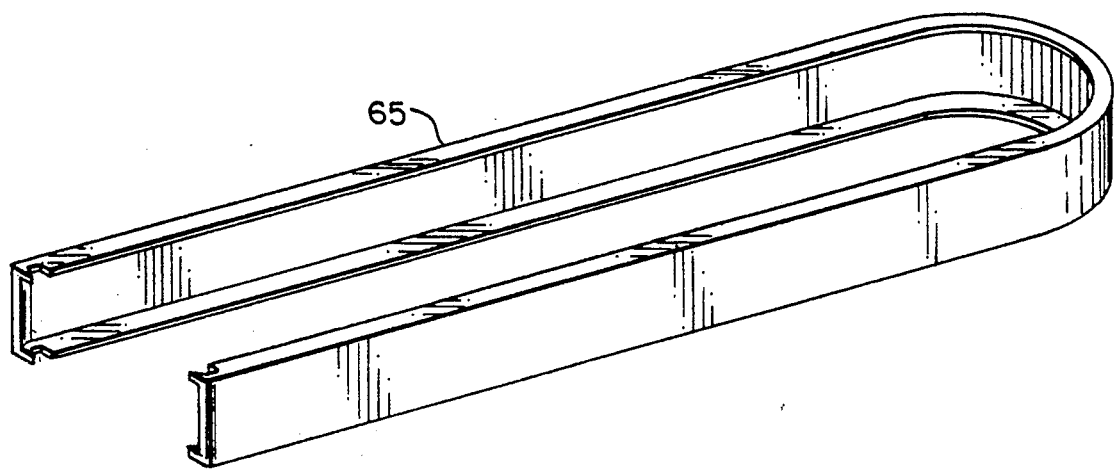
FIG. 9 is a perspective view of a tool for inserting and removing crystals and crystal holders into and from the multiple crystal head.

An extracting tool 65 for removing and replacing crystal holders 49 is shown in FIG. 9. The tool 65 is generally U-shaped, and has gripping structure at its open end. To remove and replace a crystal holder, for example, if the crystal becomes defective or degraded after extended use, the heat shield 55 is first removed from the front of the head 10. Then, the tool 65 is inserted through the windows 25 and 26, to grasp the holder 49 that is at the active station 13. Using the same tool, a new crystal in another crystal holder 49 can be installed into the carousel receptacle 49 that is in registry with the window 25 and 26. The actuator can then stop the carousel to the next station 13, and the same procedure can be followed to change out that crystal holder, and any excessive holders, as needed. Finally, the heat shield 55 can be simply replaced snapping it in place by means of the retaining pin 58. The heat shield 55 can also be removed for cleaning, and while cleaning is underway, a second, identical heat shield 55 can be installed in place on the head 10.

While this invention has been described in detail with respect to a single preferred embodiment, it should be understood that the invention is not limited to that precise embodiment; rather, many modifications and variations would present themselves to those of skill in the art without departing from the scope and spirit of this invention, as defined in the appended claims.

What is claimed is:

1. Apparatus for detecting the thickness of a vapor deposition in a chamber, comprising
    a plurality of piezoelectric crystals each of which has at least one natural resonance which shifts as material is deposited on it;

a rotary carrier having a front surface and a central pivot and distributed circumferentially about said pivot a plurality of stations at which said plurality of piezoelectric crystals are respectively disposed;

a body in which said rotary carrier is pivotally mounted, said body and said carrier being formed of a high thermal conductivity material, including means holding the front surface of the carrier out of contact with said body to define an axial space adjacent said front surface;

means formed of a resilient thermally conductive material permitting heat flow between said rotary carrier and said body while permitting relative rotation therebetween, a plate covering said rotary carrier and one side of said body, including a window therethrough which exposes a single one of said piezoelectric crystals disposed at a predetermined one of said stations aligned in registry with said window, said plate being formed of a low thermal conductivity material to shield said body and aid rotary carrier from heat of said vapor deposition;

means for selectively rotating said rotary carrier to position a desired one of said crystals into registry with said window; and a waterline cooling coil pressed into thermal contact with said body to conduct heat away from said body to said rotary carrier.

2. Apparatus according to claim 1 further comprising a removable shield covering said body and said covering plate with an opening disposed in registry with said window of said plate.

3. Apparatus for detecting the thickness of a vapor deposition in a chamber, comprising a plurality of piezoelectric crystals each of which has at least one natural resonance which shifts as material is deposited on it;

a rotary carrier having a central pivot and distributed circumferentially about said pivot a plurality of stations at which said plurality of piezoelectric crystals are respectively disposed;

a body in which said rotary carrier is pivotally mounted, said body and said carrier being formed of a high thermal conductivity material;

means formed of a resilient thermally conductive material permitting heat flow between said rotary carrier and said body while permitting relative rotation therebetween, a plate covering said rotary carrier and one side of said body, including a window therethrough which exposes a single one of said piezoelectric crystals disposed at a predetermined one of said stations aligned in registry with said window, said plate being formed of a low thermal conductivity material to shield said body and said rotary carrier from heat of said vapor deposition;

means for selectively rotating said rotary carrier to position a desired one of said crystals into registry with said window;

a waterline cooling coil pressed into thermal contact with said body to conduct heat from said body to said rotary carrier; and a removable shield covering said body and said covering plate with an opening in registry with said window of said plate;

wherein said shield includes a sheet of stainless steel having a circular portion covering said cover plate and a cylindrical flange extending over said body.

4. Apparatus according to claim 3, wherein said shield further includes a tubular heat shield extender which is affixed onto said shield at said opening and extends within said window towards said rotary carrier.

5. Apparatus according to claim 1 wherein said water line cooling coil is in the form of a loop that is sandwiched between said body and said covering plate.

6. Apparatus according to claim 3 wherein said body and said rotary carrier are formed of aluminum, and said covering plate and said shield are formed of stainless steel.

7. Apparatus for detecting the thickness of a vapor deposition in a chamber, comprising a plurality of piezoelectric crystals each of which has at least one natural resonance which shifts as material is deposited on it;

a rotary carrier having a central pivot and distributed circumferentially about said pivot a plurality of stations at which plurality of piezoelectric crystals are respectively disposed;

a body in which said rotary carrier is pivotally mounted, said body and said carrier being formed of a high thermal conductivity material;

means formed of a resilient thermally conductive material permitting heat flow between said rotary carrier and said body while permitting relative rotation therebetween;

wherein said body is generally a hollow cylinder, said carrier is in the form of a disk fitting within said hollow cylinder, and said means permitting heat flow between the rotary carrier and the body includes an annular finger spring reposed in an annular recess in said body and in contact with a rim of said carrier;

a plate covering said rotary carrier and one side of said body, including a window therethrough which exposes a single one of said piezoelectric crystals disposed at a predetermined one of said stations aligned in registry with said window, said plate being formed off a low thermal conductivity material to shield said body and said rotary carrier from heat of said vapor deposition;

means for selectively rotating said rotary carrier to position a desired one of said crystals into registry with said window; and a waterline cooling coil pressed into thermal contact with said body to conduct heat away from said body to said rotary carrier.

8. Apparatus for detecting the thickness of a vapor deposition in a chamber, comprising;

a plurality of piezoelectric crystals, each of which has at least one natural resonance which shifts as material is deposited on it;

a plurality of crystal holders, each holding an associated one of said crystals;

a rotary carrier having a central pivot and a plurality of receptacles distributed circumferentially about said pivot, each said holder fitting into an associated one of said receptacles and extractable from a front surface of said rotary carrier, each said holder having a predetermined diameter;

a body in which said rotary carrier is pivotally mounted;

a plate covering said rotary carrier and one side of said body, including a window therethrough which exposes a single one of said piezoelectric crystals disposed at one of said receptacles which is aligned in registry with said window, said plate being formed of a low thermal conductivity material to shield said body and said rotary carrier form heat of said vapor deposition, and said window having a diameter larger than the diameters of said holders so that a crystal and holder disposed in registry with said window can be extended from its associated receptacles through said window, and replaced with a similar crystal and receptacle, without disassembly of the covering plate from said body; and means for selectively rotating said rotary carrier to position a desired one of said crystals holders into registry with said window.

9. Apparatus according to claim 8 further comprising a removable shield covering said body and aid covering plate with an opening therein disposed in registry with said window in said covering plate.

10. Apparatus according to claim 9 further comprising a snap fastener means removably holding said shield onto said body.

11. Apparatus for detecting the thickness of a vapor deposition in a chamber, comprising:
a plurality of piezoelectric crystals each of which has at least one natural resonance which shifts as material is deposited upon it;
a rotary carrier having a central pivot and a plurality of stations distributed circumferentially about said pivot at which said plurality of piezoelectric crystals are respectively disposed;
a body in which said rotary carrier is pivotally mounted;
a plate covering said rotary carrier and at least one side of aid body, including a window therethrough which exposes a single one of said piezoelectric crystals disposed at a predetermined one of said stations aligned in registry with said window, said plate being formed of a low thermal conductivity material to shield said crystals and said rotary carrier from heat of said vapor deposition; and
fluid-driven stepper means mounted on said body and actuable from outside the chamber for selectively stepping said rotary carrier in one rotational chamber direction to position a desired one of said crystals into registry with said window.

12. Apparatus for detecting the thickness of a vapor deposition in a chamber, comprising:
a plurality of piezoelectric crystals each of which has at least one natural resonance which shifts as material is deposited upon it;
a rotary carrier having a central pivot and a plurality of stations distributed circumferentially about said pivot at which said plurality of piezoelectric crystals are respectively disposed;
a body in which said rotary carrier is pivotally mounted;
a plate covering said rotary carrier and at least one side of said body, including a window therethrough which exposes a single one of said piezoelectric crystals disposed at a predetermined one of said stations aligned in registry with said window, said plate being formed of a low thermal conductivity material to shield said rotary carrier from heat of said vapor deposition; and
means for selectively stepping said rotary carrier in one rotational direction to position a desired one of said crystals into registry with said window, wherein said means for selectively stepping includes a ratchet wheel coaxial with said rotary carrier and coupled to rotate with it, a movable pawl which engages said ratchet wheel and is disposed to travel in a predetermined path for a limited distance to engage and rotate said ratchet wheel in one direction and skip over the wheel in an opposite direction, and an actuator for selectively moving said pawl in said predetermined path.

13. Apparatus according to claim 12 wherein said actuator includes a pneumatic bellows coupled to said pawl.

14. Apparatus for detecting the thickness of a vapor deposition in a chamber, comprising:
a plurality of piezoelectric crystals each of which has at least one natural resonance which shifts as material is deposited upon it;
a rotary carrier having a central pivot and a plurality of stations distributed circumferentially about said pivot at which said plurality of piezoelectric crystals are respectively disposed;
a body in which said rotary carrier is pivotally mounted;
a plate covering said rotary carrier and at least one side of said body, including a window therethrough which exposes a single one of said piezoelectric crystals disposed at a predetermined one of said stations aligned in registry with said window, said plate being formed of a low thermal conductivity material to shield said crystals and said rotary carrier from heat of said vapor deposition;
means for selectively stepping said rotary carrier in one rotational direction to position a desired one of said crystals into registry with said window;
a detent wheel coaxially attached to said rotary carrier with a plurality of indentations on its periphery to correspond to positions of associated ones of said piezoelectric crystals; and
a detent boss that is movable mounted on said body to move radially in respect to said detent wheel engaging said indentations to locate and hold the associated crystals in registry with said window.

15. Apparatus according to claim 14, further comprising a spring biasing said detent boss into engagement with an aligned one of said plurality of indentations on said detent wheel.

16. Apparatus according to claim 12 further comprising a detent wheel coaxially attached to said rotor carrier with a plurality of indentations on its periphery to correspond to positions of associated ones of said piezoelectric crystals, a detent boss that is movably mounted on said body to move radially in respect to said detent wheel engaging said indentations to locate and hold the associated crystals in registry with said window, and a spring biasing said detent boss into engagement with an aligned one of said plurality of indentations on said detent wheel, wherein one side of said spring is mounted to move with said actuator so as to reduce breakout force between said boss and said detent wheel during the stroke of said actuator and pawl in said one direction and to increase the force therebetween when the actuator and pawl return in said opposite direction.

17. Apparatus according to claim 11 wherein said fluid-driven stepper means includes a relatively flexible conduit that extends therefrom to outside the chamber.

* * * * *

UNITED STATES PATENT AND TRADEMARK OFFICE
CERTIFICATE OF CORRECTION

PATENT NO. : 5,025,664
DATED : June 25, 1991
INVENTOR(S) : Kendrick et al.

It is certified that error appears in the above—identified patent and that said Letters Patent is hereby corrected as shown below:

Column 8, line 19, after "which", please insert --said--.

Column 9, line 15, please delete "aid" and insert --said--;

line 33, please delete "aid" and insert --said--;

line 42, please delete "chamber".

Signed and Sealed this

Thirteenth Day of October, 1992

Attest:

DOUGLAS B. COMER

Attesting Officer　　　　Acting Commissioner of Patents and Trademarks